Oct. 9, 1962     LE ROY W. ROGERS     3,057,669
TABLE AND LUGGAGE CARRIER COMBINATIONS
Filed Jan. 4, 1960     2 Sheets-Sheet 1

INVENTOR
Le Roy W. Rogers

Oct. 9, 1962 LE ROY W. ROGERS 3,057,669
TABLE AND LUGGAGE CARRIER COMBINATIONS
Filed Jan. 4, 1960 2 Sheets-Sheet 2

INVENTOR
Le Roy W. Rogers

United States Patent Office 3,057,669
Patented Oct. 9, 1962

3,057,669
TABLE AND LUGGAGE CARRIER
COMBINATIONS
Le Roy W. Rogers, 1009 E. College St., Iowa City, Iowa
Filed Jan. 4, 1960, Ser. No. 387
5 Claims. (Cl. 311—3)

This invention relates to improvements in combination tables and luggage carriers.

The object of this invention is to provide a structure which may be easily converted from a table to a practical luggage carrier, or just as easily converted from a luggage carrier to a table.

When used as a luggage carrier, this invention is usually secured to the roof of a vehicle, i.e. automobile, by utilizing a pair of transverse horizontal supports, commonly known as "boat bars," which are readily available commercially in several styles. A number of which clamp to the roof of a vehicle without the use of straps or vacuum cups.

Although this invention may be attached to practically any style of transverse horizontal support, it will be readily observed that one of the "clamp on" models will provide a more secure fastening to a vehicle than is usually obtained with straps or vacuum cups.

It should also be noted that this invention is adaptable to other methods of support and securing to a vehicle.

Referring now to FIGURES 1 through 5.

Figure 3:
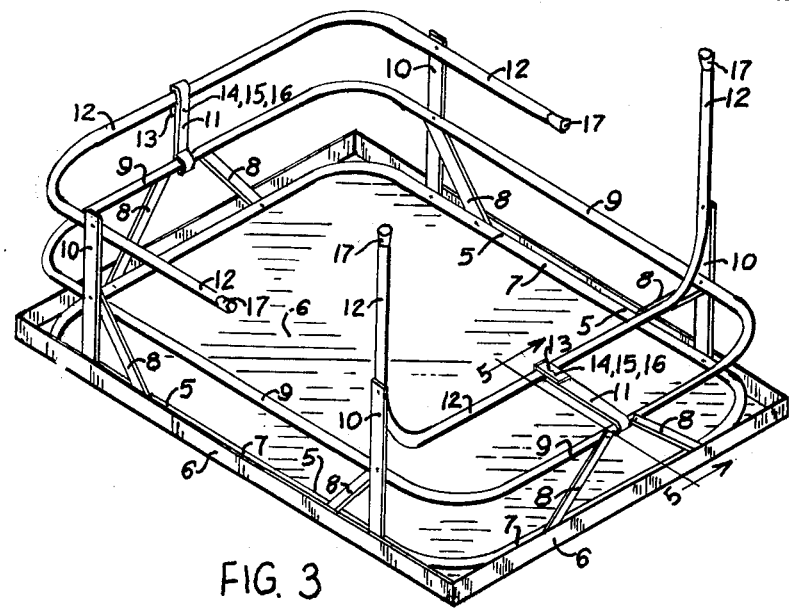

FIGURE 3 is a perspective view of the structure with both leg assemblies secured. The leg assembly nearest and to the right of the viewer is extended to the perpendicular or table position. The leg assembly furthest and to the left of the viewer is in the horizontal or folded position forming part or the carrier.

Figure 4:
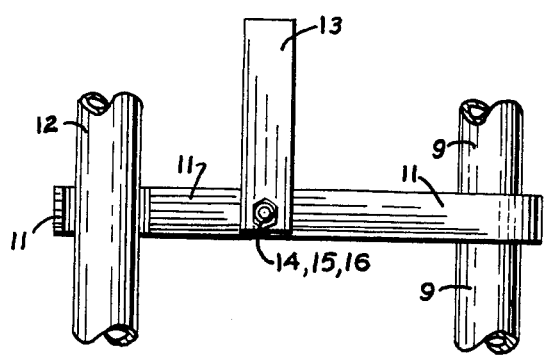

FIGURE 4 is a plan view of the hinge and latch assembly which secures the leg assemblies in either the horizontal or vertical position.

Figure 5:
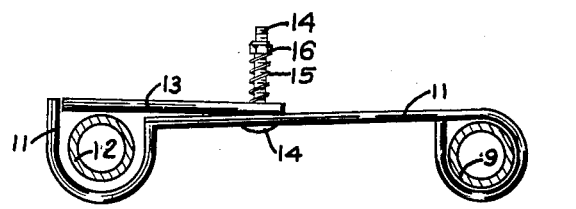

FIGURE 5 is a section through the hinge and latch assembly shown in FIGURE 4. The latch is shown closed with the leg assembly secured.

The components of this structure are numbered, commencing with number 3 and ending with the number 17.

The vehicle 1 and the horizontal supports or "boat bars" 2 are not a part of this structure. The "boat bars" 2 are properly mounted on and secured to the vehicle, and the structure is mounted on, and secured to the "boat bars."

Figure 1:
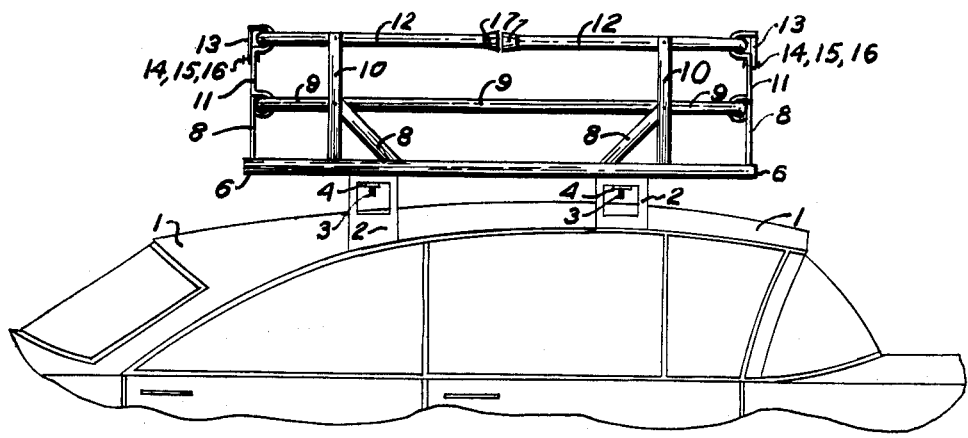
FIGURE 1 is a fragmentary side view of a vehicle showing a portion of the top, with a pair of transverse horizontal supports in place, and the structure in the form of a luggage carrier resting upon and secured to them.
Figure 2:
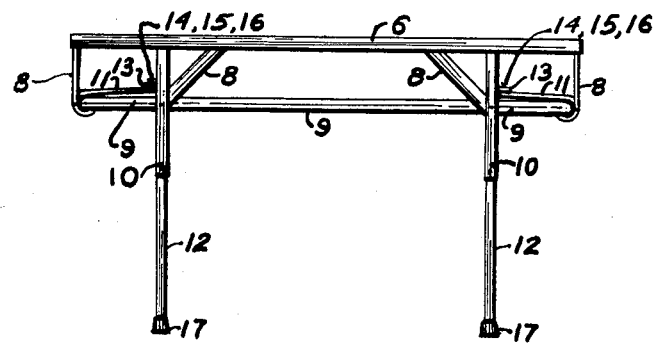
FIGURE 2 is a side view of the structure set up as a table with the legs secured in the extended or perpendicular position.

The structure may be secured to the "boat bars" by means of four bolts 3 and four wing nuts 4. Four holes 5 are drilled during manufacturing as indicated in FIGURE 1, through the tubular platform stiffener 7, and the platform 6. Matching holes are drilled in the "boat bars" 2, by positioning the structure on the bars 2 aligning the bars and using the structure as a template. The bolts 3 are then inserted through the holes 5 and the wing nuts 4 screwed on, thus securing the structure to the bars 2. The structure may then be easily removed or replaced by removing the bolts 3 and the wing nuts 4 as the occasion requires. The structure may also be tied or otherwise secured to the "boat bars" 2.

The platform 6 serves as the table top when the legs 12 are extended to the perpendicular position and the structure is inverted so the platform becomes the top of the structure. The skirt is only to improve appearance, and may be altered or eliminated as desired.

The platform 6 is attached to a tubular platform stiffener 7. Also attached to the tubular platform stiffener are eight oblique bar stiffeners 8 and four perpendicular bar supports 10.

The opposite ends of the eight oblique bar stiffeners 8 and the midpoints of the four perpendicular bar supports 10 are attached to the intermediate tubular stiffener 9, in a plane parallel to the platform 6 and the tubular platform stiffener 7.

The pair of oblique bar stiffeners 8 at each end of the structure are spaced so that the hinge 11 may pivot freely about the tubular intermediate stiffener 9.

Each of the four perpendicular bar supports 10 is fastened to the tubular platform stiffener 7, the tubular intermediate stiffener 9 and one end of an oblique bar stiffener 8 in such a manner as to provide a point of attachment for the tubular leg assembly 12, which pivots about hte points of attachment as shown in FIGURE 3.

The leg assemblies 12 are of the same material as the tubular stiffeners 7 and 9, and each leg assembly is formed in a U shape. Two leg assemblies being the same as one tubular stiffener except for being cut to receive the leg ends 17.

The leg assemblies 12 can be secured with the legs either perpendicular or parallel to the tubular stiffeners 7 and 9. When in the perpendicular or extended position, the legs assemblies 12 are legs for the table. When in the parallel or folded position they are parts of the frame of the carrier.

Each leg assembly 12 is held in either the extended or the folded position by a hinge 11 one end of which rotates about the tubular intermediate stiffener 9 the other end is formed into a hook and engages the center of the leg assembly 12, as shown in FIGURE 3.

Referring now to FIGURES 4 and 5 which are closer views of the hinge.

Each hinge 11 is formed of a flat bar stock and has a latch 13 made of the same material which is used to close the hook. The latch 13 is fastened to the hinge by means of a bolt 14 passing through holes drilled in the hinge 11 and the latch 13, with a spring 15 slipped onto the bolt 14 and a nut 16 screwed onto the bolt 14 causing tension on the latch 13. The end of the latch 13 is cut square to fit the hook end of the hinge 11, which prevents the latch 13, from rotating. This keeps the hinge 11 properly engaged with the leg assembly 12 thus securing the leg assembly in the desired position.

To change the position of the leg assembly 12 as shown in FIGURE 5, a force is exerted on the hinge 11 to rotate it away from the leg assembly 12. As the rotation continues the latch 13 comes into contact with the leg assembly 12. The spring 15 is compressed until the square end of the latch 13 is free of the hook end of the hinge 11. The latch may then be rotated about the bolt 14 to the position shown in FIGURE 4. This allows further rotation of the hinge 11 about the intermediate tubular stiffener 9 which in turn releases the leg assembly 12 so that it may be partially rotated about its points of attachment to two of the perpendicular bar supports 10 to the other position at which time the hinge 11 may be re-engaged to hold it in place.

To secure the hinge 11 as in FIGURE 5. The hinge 11 is brought into position as in FIGURE 4. The latch 13 is rotated about the bolt 14 until the square end comes in contact with the hook end of the hinge 11. Force is applied to compress the spring 15 until the latch 13 may be turned into position, at which time the force is released. This secures the hinge 11 to the leg assembly 12 as shown in FIGURE 5 thereby concluding the conversion.

I claim:
1. In a demountable combination table and cargo carrier for a vehicle having a platform member, said platform member receiving rigidity from a stiffener attached along its perimeter, bar supports attached to said stiffener, a rigid frame member attached to said bar supports at a distance from and parallel to said stiffener, a pair of oppositely disposed moveable frame members integrally connected to coact with said platform member, said moveable frame members being attached to said bar supports at a distance from said rigid frame member and at a greater distance from said stiffener, and clamping means to hold said moveable frame members in predetermined positions, each of said clamping means comprising a hinge and a fastening device, one end of said hinge being attached to rotate about said rigid frame member and the other end of said hinge being attached to said fastening means, said fastening means being adapted to hold said moveable frame members in predetermined positions.

2. In a demountable combination table and cargo carrier for a vehicle having a platform member, said platform member receiving rigidity from a stiffener attached along its perimeter, bar supports attached perpendicularly to said stiffener, a rigid frame member attached to said bar supports at a distance from and parallel to said stiffener, a pair of oppositely disposed moveable frame members integrally connected to coact with said platform member, said moveable frame members being attached to said bar supports at a distance from said rigid frame member and at a greater distance from said stiffener, and clamping means to hold said moveable frame members in a plane parallel to said stiffener or in a plane perpendicular to said stiffener, each of said clamping means comprising a hinge and fastening device, one end of said hinge being attached to rotate about said rigid frame member, said hinge being held in place by bar stiffeners, and the other end of said hinge being attached to said fastening means, said fastening means being adapted to hold said moveable frame members in predetermined positions.

3. In a demountable combination table and cargo carrier for a vehicle having a platform member, said platform member receiving rigidity from a stiffener attached along its perimeter, bar supports attached perpendicularly to said stiffener, a rigid frame member attached to said bar supports at a distance from and parallel to said stiffener, a pair of oppositely disposed moveable frame members integrally connected to coact with said platform member, said moveable frame members being attached to said bar supports at a distance from said rigid frame member and at a great distance from said stiffener, and clamping means to hold said frame members in predetermined positions, said clamping means comprising two oppositely disposed latch assemblies each having a hinge attached to said rigid frame member so that one end of said hinge is free to rotate about said rigid frame member, the other end of said hinge being formed into a hook which engages one of said moveable frame members in predetermined positions to give said moveable frame member rigidity, said hook being secured to said moveable frame member by a rotary latch attached to said hinge, said hinge being held in place at the midpoint of a side of said demountable combination table and cargo carrier by bar stiffeners.

4. In a demountable combination table and cargo carrier for a vehicle having a platform member, said platform member receiving rigidity from a stiffener attached along its perimeter, bar supports attached perpendicularly to said stiffener, a rigid frame member attached to said bar supports at a distance from and parallel to said stiffener, a pair of oppositely disposed moveable frame members integrally connected to coact with said platform member, said moveable frame members being attached to said bar supports at a distance from said rigid frame member and at a greater distance from said stiffener, and clamping means to hold said frame members in a plane parallel to said stiffener or in a plane perpendicular to said stiffener, said clamping means comprising two oppositely disposed latch assemblies each having a hinge attached to said rigid frame member so that one end of said hinge is free to rotate about said rigid frame member, the other end of said hinge being formed into a hook which engages one of said moveable frame members in predetermined positions to give said moveable frame member rigidity, said hook being secured to said moveable frame member by a rotary latch attached to said hinge, said hinge being held in place at the midpoint of a side of said demountable combination table and cargo carrier by stiffeners, said stiffeners being attached to said rigid frame member and to said platform member.

5. In a demountable combination table and cargo carrier for a vehicle having a platform member, said platform member receiving rigidity from a stiffener attached along its perimeter, bar supports attached perpendicularly to said stiffener, a rigid frame member attached to said bar supports at a distance from and parallel to said stiffener, a pair of moveable frame members integrally connected to co-act with said platform member, each of said moveable frame members being attached to two of said bar supports at a distance from said rigid frame member and at a greater distance from said stiffener, each of said movable frame members being free to rotate about points of attachment to predetermined positions, and rigid connecting means to secure said movable frame members in a plane parallel to said stiffener or in a plane vertical to said stiffener, said rigid connecting means comprising two oppositely disposed latch assemblies each having a hinge attached to the midpoint of a side of said rigid frame member the other end being formed into a hook with a rotary latch to close the hook, said latch assembly being held in place by bar stiffeners and free to partially rotate about said rigid frame member thus permitting the hook to engage the center portion of a moveable frame member securing said moveable frame member in the desired postion.

References Cited in the file of this patent

UNITED STATES PATENTS

| | | |
|---|---|---|
| 1,766,085 | Rumer | June 24, 1930 |
| 2,654,516 | Edwards | Oct. 6, 1953 |
| 2,663,472 | Belgau | Dec. 22, 1953 |
| 2,708,613 | Heckman | May 17, 1955 |
| 2,965,424 | Baney | Dec. 20, 1960 |

FOREIGN PATENTS

| | | |
|---|---|---|
| 852,505 | France | Feb. 6, 1940 |